Jan. 12, 1960 W. H. ANDERSON 2,921,310

MULTI-BAND TELEVISION ANTENNA

Filed April 25, 1955 2 Sheets-Sheet 1

INVENTOR

WARNER H. ANDERSON

Warren D Hackbert

ATTORNEY

Jan. 12, 1960 W. H. ANDERSON 2,921,310

MULTI-BAND TELEVISION ANTENNA

Filed April 25, 1955 2 Sheets-Sheet 2

INVENTOR

WARNER H. ANDERSON

BY

ATTORNEY

United States Patent Office 2,921,310

Patented Jan. 12, 1960

2,921,310

MULTI-BAND TELEVISION ANTENNA

Warner H. Anderson, Hamilton County, Ill., assignor, by mesne assignments, to Channel Master Corporation, Ellenville, N.Y., a corporation of New York Application April 25, 1955, Serial No. 503,698

3 Claims. (Cl. 343—815)

The present invention relates to an improvement in television antennas and more particularly to a new and improved collector system for a television antenna which provides effective all-channel operation.

Heretofore, to obtain satisfactory reception in the very-high-frequency television bands, i.e. in the frequencies represented by channels 2–6, inclusive, and channels 7–13, inclusive, it has usually been the custom to employ an antenna cut for each desired channel. However, due to geographical and mounting conditions, as well as the desire to receive more than one channel readily without a great amount of expense, it has been an object to effect a single antenna structure capable of functioning effectively in all channels in the very-high-frequency band of television operation.

The present invention provides a collector system for an all-channel television antenna which operates effectively with favorable electrical characteristics through all channels and which is capable of use with any desired director system and in any combination of elements or arrays. The collector system disclosed herein utilizes the folded dipole principle in the low frequency band and functions as isolated half wave elements in the high frequency band. The applicant's novel collector system provides desirable impedance characteristics and a bi-directional field strength pattern over the entire low frequency band, and presents an optimum impedance match to the transmission line and affords a field strength pattern somewhat stronger in the direction of antenna directivity effectively independent of the low frequency band structure in the high frequency band.

The present invention has, therefore, as a principal object the provision of a television antenna having a collector system whcih receives a television signal effectively in both the low and high frequency bands of the very-high-frequency television spectrum and provides a favorable field strength pattern in both the low and high frequency bands.

A further and more general object of the invention is to provide a collector system for a television antenna which operates in all channels without the necessity of utilizing multiple units cut for each desired channel of frequency.

Another object of the invention is to provide a television antenna having a collector system which is easy to assemble and which is readily adapted to various mounting installations.

A still further object of the invention is to provide a collector system for an all-channel television antenna which may be effectively combined with any form of director system for effective operation in various arrays.

Other objects and a better understanding of the invention will become more apparent from the following detailed description, taken in conjunction with the accompanying drawings, in which.

Figure 1:
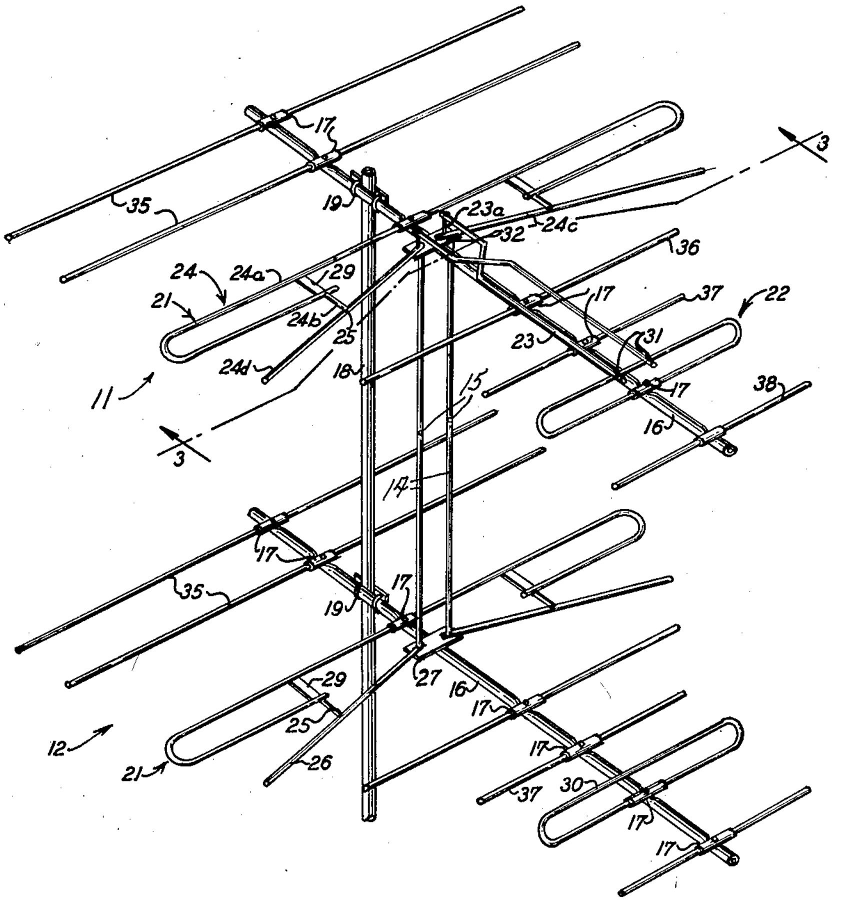
Figure 1 is a diagrammatic perspective view, looking downward, of the collector system of the present invention embodied in a typical assembled stacked antenna array.

For the purposes of promoting an understanding of the principles of the invention, reference will now be made to the embodiment illustrated in the drawings, and specific language will be used to describe the same. It will nevertheless be understood that no limitation of the scope of the invention is thereby intended, such alterations and further modifications in the illustrated device, and such further applications of the principles of the invention as illustrated therein, being contemplated as would normally occur to one skilled in the art to which the invention relates.

Referring now to Figure 1, a typical assembled bay of two stacked television antennas is shown embodying the applicant's novel collector system. The assembled antenna structure comprises an upper antenna system 11 and a lower antenna system 12, with stacking bars 14 being provided therebetween having facilities thereon as holes 15, for example, for receiving a transmission line (not shown). As the upper antenna system 11 and the lower antenna system 12 are constructed similarly, the applicant will describe the structure and function of a single system utilizing his novel collector system, as shown more particularly in Figure 2.

Figure 2:
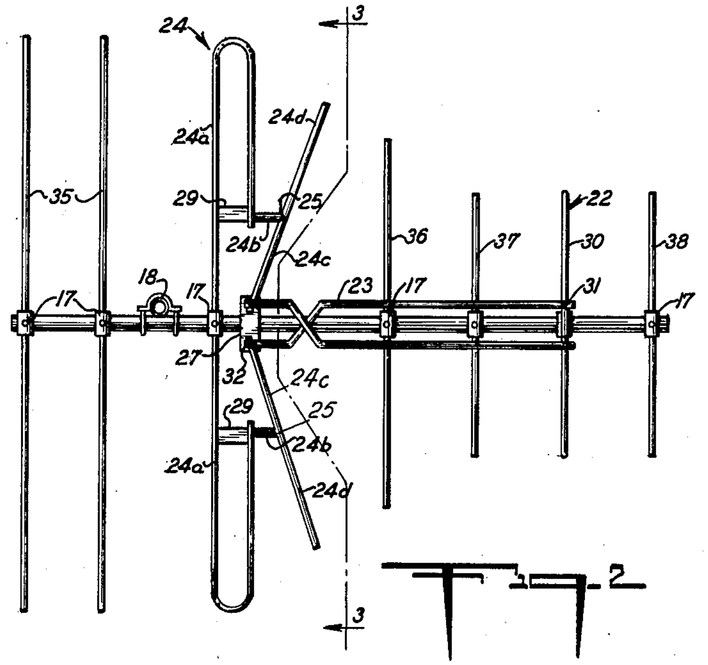
Figure 2 is a diagrammatic plan view of the collector system embodied in the antenna array of Figure 1.

The elements comprising the antenna system of Figure 2 attach to a boom 16 by means of conventional clamps 17, the boom 16 being supported on a mast 18 through the use of a conventional U-bolt and saddle assembly 19. The antenna elements and the boom 16 may be formed from lightweight aluminum or the like, for example, as is the custom in the art.

The applicant's novel collector system comprises as a collector 21 a dipole element 24 comprising sections **24*a*, 24*b* and 24*c*, modified and folded in the direction of antenna directivity. Sections 24*d* connect to the element 24 at points 25 representing minimum voltage in the high frequency band. Sections 24*c* of element 24 connect to the boom 16 through insulators 27. In the typical embodiment of the invention disclosed herein, an insulating member 29 connects between the junction of sections 24*a* and 24*b* and sections 24*a* to provide additional structural strength. As the insulating members 29 do not affect the electrical characteristics of the collector system, they may be omitted, if desired. As sections 24*d* and 24*c* combine to form collectors for the high frequency band, it should be understood that sections 24*d* and 24*c* may be parallel to the sections 24*a* of element 24**, but preferably lie at an angle therewith, as shown in Figure 1 and Figure 2, to provide optimum impedance matching and horizontal directivity.

Figure 3:
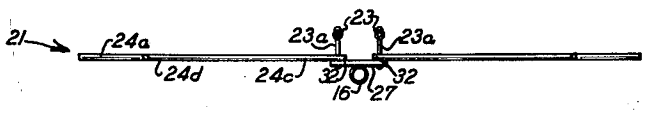
Figure 3 is a diagrammatic view in elevation, taken at line 3—3 of Figure 1 and Figure 2 and looking in the direction of the arrows, showing the collector system of the invention.

In the antenna embodiment illustrated in Figure 1 and Figure 2, the collector 21 is typically combined with reflectors 35, a director 36, a reflector 37, a collector 22 and a director 38, from back to front in the direction of antenna directivity. The collector 22 used in this typical array comprises a folded dipole element 30, the element 30 preferably lying in a plane at right angles to the plane of collector 21, as is well known in the custom of the art. A phasing section 23 connects, as by bolting, for example, to the element 30 of collector 22 at 31, and to collector 21, as by bolting, for example, through spacers **23*a* positioned at the feed points 32 thereof at the insulator 27. Stacking bars 14 connect to the feed points 32 of the collector 21**, as shown more particularly in Figure 3.

Electrically, element 24 of the collector 21 functions in a dual capacity as a modified folded dipole in the low frequency band and as two isolated approximately half wave elements in the high frequency band of the very-high-frequency television spectrum. The collector 21 resonates at a frequency affording good signal coverage in the low frequency band, and as the collector system is very broad band because of its novel structure, optimum impedance matching characteristics and a bi-directional field strength pattern without minor lobes are provided over the entire low frequency band.

Since sections **24*d* combine with sections 24*c* of the element 24 and connect thereto at 25 at their minimum voltage points in the high frequency band, the functioning thereof as collectors in the high frequency band is electrically isolated from the other sections of element 24. As the sections 24*d* and 24*c* forming the high frequency band collectors are closely spaced to the other sections of element 24 and are parallel with the impedance thereof, an optimum impedance match is presented to the transmission line in the high frequency band and the field strength pattern in the high frequency band is somewhat stronger in the direction of antenna directivity essentially the same as if element 24** was not present.

In the typical illustration of the applicant's novel collector system shown in Figure 1 and Figure 2, the length of element 24 of the collector 21 approximates 90 inches, the length of section **24*c* and 24*d* combining to form the collector in the high frequency band approximating 32 inches. Section 24*b* of element 24 approximates 3¼ inches in length, as do the insulators 29. Approximately 3¼ inches in distance is provided between clamp 17 and the insulator 27 along the boom 16 of the collector 21**. It should be obvious, of course, that the above dimensions are typical and are susceptible to change within the teachings of the invention.

Figure 4:
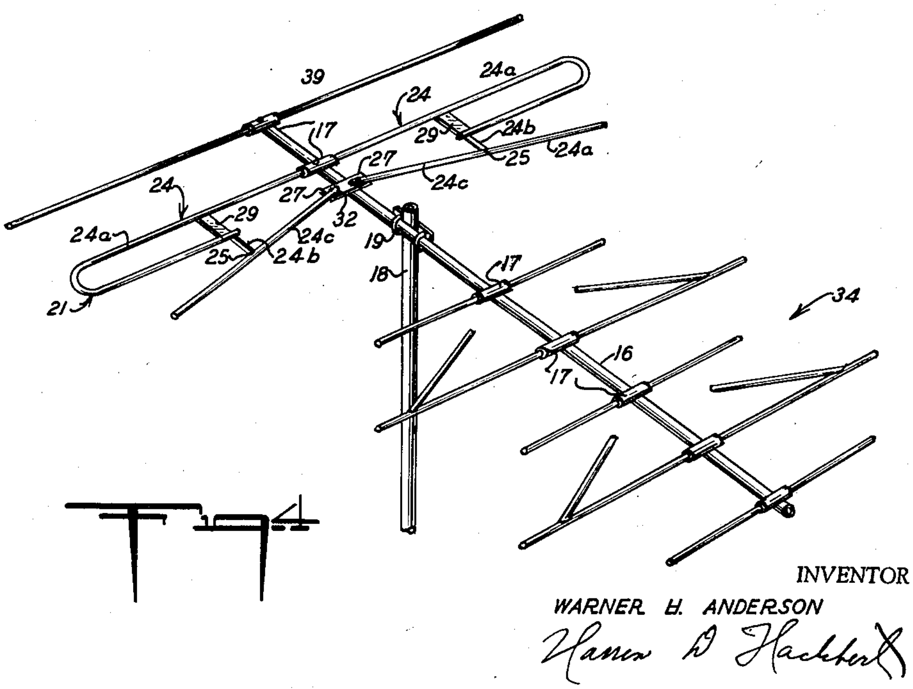
Figure 4 is a diagrammatic perspective view, looking downward, of the collector system of the invention in combination with another form of director system.

Figure 4 discloses the applicant's novel collector system in combination with the form of director system 34 disclosed in the applicant's co-pending application, Serial No. 503,275, filed April 22, 1955, for Television Antenna. It should be understood from the figure that the collector 21 is capable of effecive operation with various director systems and in single or stacked arrays within the scope of the invention.

From the preceding, it should be apparent that the applicant has provided a novel collector system for use in an all-channel television antenna operating in the very-high-frequency television spectrum which affords a bi-directional field strength pattern in the low frequency band and a field strength pattern somewhat stronger in the direction of antenna directivity in the high frequency band. As indicated, the collector system is capable of various modifications. For example, the sections comprising the collector for the high frequency band may be V'd in the direction of antenna directivity at various angles to obtain modified field strength patterns and electrical characteristics for certain locations. Moreover, ultra-high-frequency stubs may be added to sections **24*c* of element 24** so that the antenna functions as a collector in the ultra-high-frequency spectrum. Thus, the above description should be considered as illustrative and not as limiting the scope of the following claims.

I claim:

1. A collector system for an all-channel television antenna for low frequency band and high frequency band operation comprising, in combination, a modified folded dipole element serving as a means for collecting television signals in the low frequency band, said element comprising a continuous linear conductive member having its end portions bent back and coplanarly parallel to the center section over only a portion of said center section, with the tips of said end portions relatively widely spaced from one another, and means for collecting television signals in the high frequency band, said high frequency band television signal collecting means comprising a pair of further elements coplanar with said first element, each of said further elements overlapping a respective one of said bent back first element end portions, said pair of further elements extending inwardly from said end portion tips toward one another with the innermost ends of said further elements spaced more closely than the spacing between first element tips, each of said further elements having a point therealong of minimum voltage in the high frequency band, conductive means directly connecting each of said first element end portions to the said minimum voltage point of a respective one of said further elements, and a pair of transmission line terminals at the innermost ends of said further elements, whereby said high frequency signal collecting means is electrically isolated in the high frequency band from the remainder of said system.

2. In an all-channel very-high-frequency television antenna for low frequency and high frequency band operation positioned on a boom, a collector system comprising, in combination, a modified folded dipole element serving as a means for collecting television signals in the low frequency band, said element comprising a continuous linear conductive member having its end portions bent back and coplanarly parallel to the center section over only a portion of said center section, with the tips of said end portions relatively widely spaced from one another, and means for collecting television signals in the high frequency band, said high frequency band television signal collecting means comprising a pair of further elements coplanar with said first element, each of said further elements overlapping a respective one of said bent back first element end portions, said pair of further elements extending inwardly from said end portion tips toward one another with the innermost ends of said further elements spaced more closely than the spacing between first element tips, each of said further elements having a point therealong of minimum voltage in the high frequency band, conductive means directly connecting each of said first element end portions to the minimum voltage point of a respective one of said further elements, and a pair of transmission line terminals at the innermost ends of said further elements, whereby said high frequency signal collecting means is electrically isolated in the high frequency band from the remainder of said system.

3. Apparatus as claimed in claim 2 wherein said center section of said modified folded dipole element is connected to said boom.

References Cited in the file of this patent

UNITED STATES PATENTS

| | | |
|---|---|---|
| Re. 23,273 | Kearse | Sept. 26, 1950 |
| 2,471,256 | Wintermute | May 24, 1949 |
| 2,700,105 | Winegard | Jan. 18, 1955 |

FOREIGN PATENTS

| | | |
|---|---|---|
| 1,054,863 | France | Feb. 15, 1954 |